United States Patent
Schramm et al.

(10) Patent No.: US 6,272,420 B1
(45) Date of Patent: Aug. 7, 2001

(54) METHOD AND DEVICE FOR DETECTING MOTOR VEHICLE TILT

(75) Inventors: Herbert Schramm, Leonberg; Peter Dominke, Bietigheim-Bissingen; Klaus-Dieter Leimbach, Moeglingen; Gabriel Wetzel, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,133

(22) PCT Filed: Jul. 29, 1998

(86) PCT No.: PCT/DE98/02141

§ 371 Date: Oct. 18, 1999

§ 102(e) Date: Oct. 18, 1999

(87) PCT Pub. No.: WO99/26812

PCT Pub. Date: Mar. 3, 1999

(30) Foreign Application Priority Data

Nov. 22, 1997 (DE) ............................................... 197 51 925

(51) Int. Cl.$^7$ ...................................................... G06F 7/00
(52) U.S. Cl. ................... 701/72; 180/282; 280/5.507; 303/146; 701/91
(58) Field of Search .................................... 701/1, 37, 38, 701/70–72, 91; 180/271, 272, 282; 280/5.502, 5.506, 5.507; 303/140, 146

(56) References Cited

U.S. PATENT DOCUMENTS

| 3,609,313 | 9/1971 | Lucien . |
| 4,023,864 | 5/1977 | Lang et al. . |
| 4,386,674 | 6/1983 | Sugata . |
| 4,964,679 | 10/1990 | Rath . |
| 5,446,658 | 8/1995 | Pastor et al. . |
| 5,471,386 | 11/1995 | Davorin et al. . |

FOREIGN PATENT DOCUMENTS

| 32 221 149 | 11/1983 | (DE) . |
| 39 33 653 | 4/1991 | (DE) . |
| 42 28 893 | 3/1994 | (DE) . |
| 43 42 732 | 6/1995 | (DE) . |
| 44 16 991 | 11/1995 | (DE) . |
| 196 32 943 | 2/1998 | (DE) . |
| 0 330 149 | 8/1989 | (EP) . |
| 2 425 342 | 12/1979 | (FR) . |
| 2 257 403 | 1/1993 | (GB) . |
| 1-101238 | 4/1989 | (JP) . |
| WO 97 28017 | 8/1997 | (WO) . |

OTHER PUBLICATIONS

Zanten et al., *FDR–Die Fahrdynamik–Regelung Von Bosch*, ATZ Automobiltechnische Zeitschrift., vol. 16, No. 11, pp. 674–689 (Nov. 1994).

Limpert Leiber, *Der Elektronische Bremsregler*, ATZ Automobiltechnische Zeitschrift., vol. 71, No. 6, pp. 181–189 (Jun. 1969).

*Primary Examiner*—William A. Cuchlinski, Jr.
*Assistant Examiner*—Edward Pipala
(74) *Attorney, Agent, or Firm*—Kenyon & Kenyon

(57) ABSTRACT

A method and an apparatus relate to the detection of a tilt tendency of a vehicle about a vehicle axis oriented in the longitudinal direction of the vehicle. For this purpose, for at least one wheel, a variable describing the wheel rotation speed and at least one variable representing the transverse dynamics of the vehicle are ascertained. As a function of one of the variables representing the transverse dynamics of the vehicle, braking torques and/or drive torques are briefly generated and/or modified at at least one wheel. While the braking torques and/or drive torques at the at least one wheel are being briefly generated and/or modified, and/or after they have been briefly generated and/or modified, a variable which quantitatively describes the wheel behavior is determined for that at least one wheel, as a function of the variable describing the wheel rotation speed of that wheel. As a function of that variable quantitatively describing the wheel behavior of that wheel, a determination is made as to whether there is a tilt tendency of the vehicle about a vehicle axis oriented in the longitudinal direction of the vehicle.

19 Claims, 6 Drawing Sheets

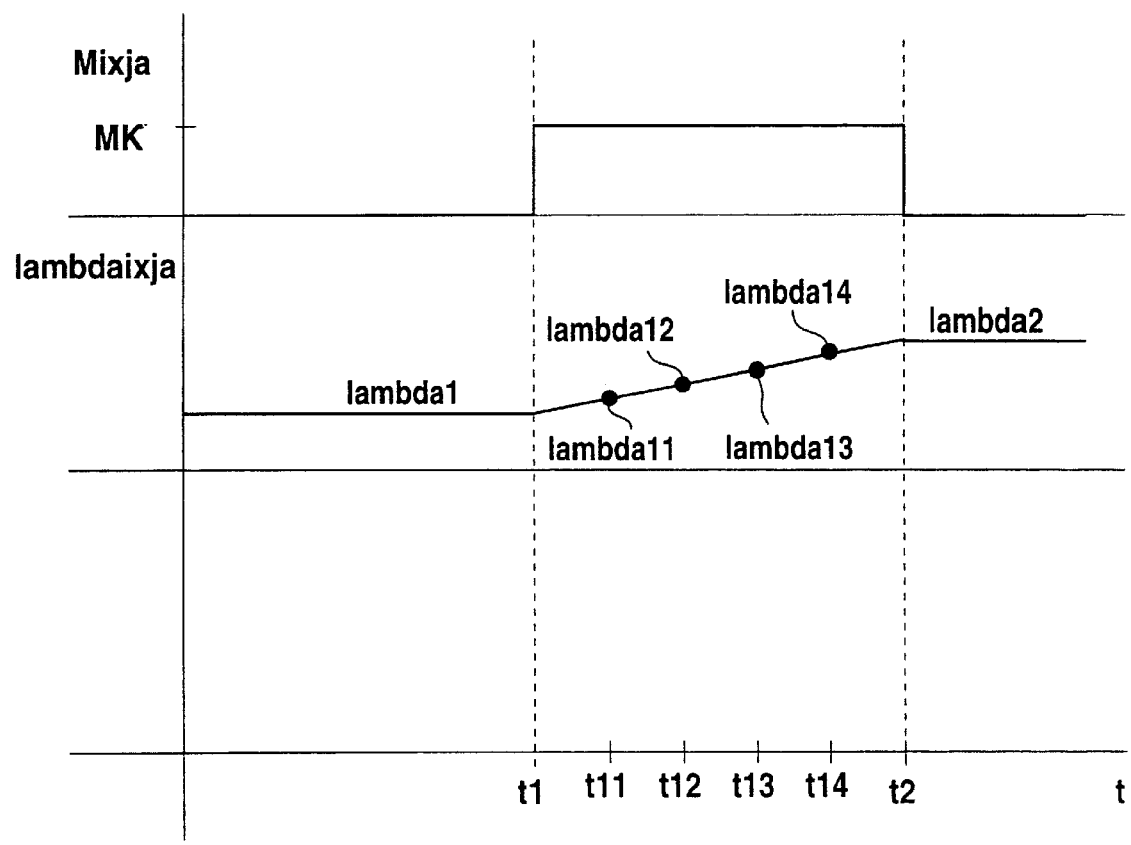

METHOD AND DEVICE FOR DETECTING MOTOR VEHICLE TILT

FIELD OF THE INVENTION

The present invention relates to a method and an apparatus for detecting a tilt tendency of a vehicle.

BACKGROUND INFORMATION

Methods and apparatuses for detecting a tilt tendency of a vehicle are known from the existing art in many modifications.

German Patent No. 44 16 991 describes a method and a device for warning the driver of a commercial vehicle of a tilt hazard when driving around a curve. To accomplish this, before the vehicle is driven into a curve, the vehicle model and the status data relevant to the tilt hazard are sensed, and the tilt risk and the speed limit governing it are determined as a function of the vehicle center of gravity and the curve radius. A signal requesting a speed reduction is triggered if the current speed of the vehicle constitutes a tilt risk, or if a predefined safety margin in terms of tilt hazard has been breached. The vehicle speed at which a tilt hazard definitely does not exist is determined from a tilt equation. The tilt equation comprises, inter alia, the vehicle speed, curve radius through which the vehicle is traveling, height of the vehicle center of gravity above the road surface, and any imbalance in wheel loads. Wheel loads are ascertained with the aid of wheel load sensors embedded in the road surface. If the vehicle speed violates a predefined safety margin with respect to the vehicle speed lying at the tilt hazard limit, a signal is generated warning the driver of the vehicle of excessive speed while traveling through the curve. The signal indicating the excessive vehicle speed is triggered until the particular measured speed is reduced to a degree which excludes any risk of tilt. In addition, German Patent No. 44 16 991 indicates that slippage of the wheels of the respective vehicle on the road surface can be ascertained and can be taken into account in assessing the tilt hazard.

It is an object of the present invention to improve existing methods and apparatuses for detecting a tilt tendency of a vehicle.

SUMMARY OF THE INVENTION

A method according to the present invention detects a tilt-tendency of a vehicle about a vehicle axis oriented in the longitudinal direction of the vehicle. This is done by determining, for at least one wheel, a variable describing the wheel rotation speed. In addition, at least one variable representing the transverse dynamics of the vehicle is determined. Advantageously, braking torques and/or drive torques are briefly generated and/or modified at least at one wheel as a function of at least one of the variables representing the transverse dynamics of the vehicle. While the braking torques and/or drive torques at the at least one wheel are being briefly generated and/or modified, and/or after the braking torques and/or the drive torques have been briefly generated and/or modified at the at least one wheel, a variable which quantitatively describes the wheel behavior is determined for that at least one wheel, at least as a function of the variable describing the wheel rotation speed of that wheel. At least as a function of the variable ascertained for the at least one wheel that quantitatively describes the wheel behavior of that wheel, a determination is made as to whether there is a tilt tendency of the vehicle about a vehicle axis oriented in the longitudinal direction of the vehicle.

Be it noted at this juncture that when the phase "tilt tendency of the vehicle" is used hereinafter, what is meant is "the tendency of the vehicle to tilt about a vehicle axis oriented in the longitudinal direction of the vehicle." The phrase "a vehicle axis oriented in the longitudinal direction of the vehicle" is to be understood as follows: On the one hand, the vehicle axis about which the tilt tendency of the vehicle occurs can be the actual longitudinal vehicle axis. On the other hand, it can be a vehicle axis which is rotated through a certain angle with respect to the actual longitudinal vehicle axis. It is immaterial in this context whether or not the rotated vehicle axis passes through the center of gravity of the vehicle. The case of a rotated vehicle axis is intended also to include an orientation of the vehicle axis in which the vehicle axis corresponds either to a diagonal axis of the vehicle or to an axis parallel thereto.

Advantageously, the method for detecting a tilt tendency of the vehicle is used in the context of a method for stabilizing the vehicle, in particular in the context of a method for preventing tipover of the vehicle.

When a tilt tendency of the vehicle is present, advantageously, in order to stabilize the vehicle and, in particular to prevent the vehicle from tipping over, at least braking interventions are performed at least on one wheel and/or engine interventions and/or interventions on chassis actuators are performed.

If the vehicle is behaving, prior to tipover, in highly oversteering fashion and if it is rolling off over the front wheel on the outside of the curve when tipping over, advantageously, in order to stabilize the vehicle, a braking intervention is performed at least on the front wheel on the outside of the curve in such a way as to generate and/or increase a braking torque at that wheel. The slip conditions at that wheel thus change in such a way that only minor lateral forces are transferred, and the tilt tendency of the vehicle and thus the vehicle's tipover risk are reduced.

It has proven to be advantageous that the magnitude of one of the variables representing the transverse dynamics of the vehicle is compared to a threshold value. Detection of whether a tilt tendency of the vehicle about a vehicle axis oriented in the longitudinal direction of the vehicle is present is performed if the magnitude of the one variable representing the transverse dynamics of the vehicle is greater than the threshold value. As a result, the method according to the present invention is activated only in those transverse-dynamic vehicle situations in which a tilt tendency of the vehicle is to be expected.

Advantageously in this context, as one of the variables representing the transverse dynamics of the vehicle, a variable describing the transverse acceleration and/or one describing the yaw rate of the vehicle is sensed using suitable measurement means and/or is ascertained at least as a function of the variables describing the wheel rotation speed.

Advantageously a determination is made, at least as a function of one of the ascertained variables representing the transverse dynamics of the vehicle, as to which wheels of the vehicle are suitable for detecting a tilt tendency of the vehicle about a vehicle axis oriented in the longitudinal direction of the vehicle. Detection of the tilt tendency is performed on the basis of at least one of those wheels, by briefly generating and/or modifying braking torques and/or drive torques at at least one of those wheels. The wheels identified as the suitable wheels are those wheels which are threatening to lift off. The detection according to the present invention of the tilt tendency is consequently performed directly on the basis of the wheels at risk.

The wheels threatening to lift off are normally the vehicle wheels on the inside of the curve. Advantageously, therefore, a determination is made, as a function of a variable which is ascertained from a variable describing the steering angle and/or from a variable describing the transverse acceleration of the vehicle and/or a variable describing the yaw rate of the vehicle, as to whether the vehicle is traveling through a curve, and its nature. At least one of the wheels of the vehicle located on the inside of the curve is selected for detection of a tilt tendency of the vehicle.

It is furthermore advantageous, in ascertaining which wheels of the vehicle are suitable for detecting a tilt tendency of the vehicle and/or in briefly generating and/or modifying the braking torques and/or drive torques at at least one wheel, if the drive concept of the vehicle, i.e., whether it is a vehicle with front-wheel, rear-wheel, or all-wheel drive, is additionally taken into account.

For brief generation and/or modification of the braking torque, the actuator associated with the respective wheel, with which braking torques can be generated, is advantageously activated so that a slight braking torque is built up, and/or so that the activation of the actuator results in a slight change in a previously generated braking torque.

Similarly, for brief generation and/or modification of the drive torque, a means associated with the vehicle engine with which the engine torque delivered by the engine can be influenced, and the actuators associated with the wheels with which braking torques can be generated at the respective wheels, are advantageously activated so that as a result of the activation of the means associated with the engine and the actuator, a slight drive torque is generated and/or so that there is a slight change in a previously generated drive torque.

Advantageously, a variable describing the slip of the respective wheel is ascertained for the at least one wheel as the variable quantitatively describing the wheel behavior. It is also possible to use for the at least one wheel, as the variable quantitatively describing the wheel behavior, the variable which itself describes the wheel rotation speed of the corresponding wheel and/or which describes the change over time in the wheel rotation speed of the corresponding wheel.

The variable describing the slip of the respective wheel is advantageously ascertained at least as a function of the corresponding variable describing the wheel rotation speed and of a variable describing the vehicle speed, the variable describing the vehicle speed being ascertained at least as a function of the variables, ascertained for the wheels, which describe the wheel rotation speeds.

Advantageously, to detect a tilt tendency of the vehicle about a vehicle axis oriented in the longitudinal direction of the vehicle, the resulting change in the variable quantitatively describing the wheel behavior is ascertained during the time period in which the braking torques and/or drive torques are briefly generated and/or modified at the at least one wheel and/or after the braking torques and/or drive torques have been briefly generated and/or modified at the at least one wheel. On this basis, a tilt tendency of the vehicle is present if the magnitude of the resulting change in the variable quantitatively describing the wheel behavior is greater than a corresponding threshold value.

For the situation in which individual braking interventions are not possible at the vehicle wheels, at least as a function of one of the variables representing the transverse dynamics of the vehicle, braking torques and/or drive torques are advantageously briefly generated and/or modified simultaneously at all the wheels of the vehicle.

BRIEF DESCRIPTION OF THE DRAWINGS

FIG. 4 shows a schematic illustrating a manner in which a brief modification in a wheel torque affects a slip of a wheel according to the present invention.

Be it noted that blocks with the same designation in different Figures have the same function.

DETAILED DESCRIPTION

Figure 1A:
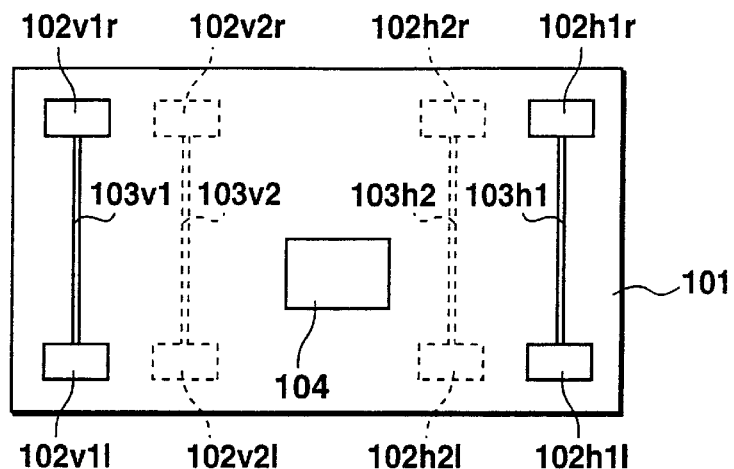
FIG. 1a shows a one-piece vehicle for which a method according to the present invention may be used.
Figure 1B:
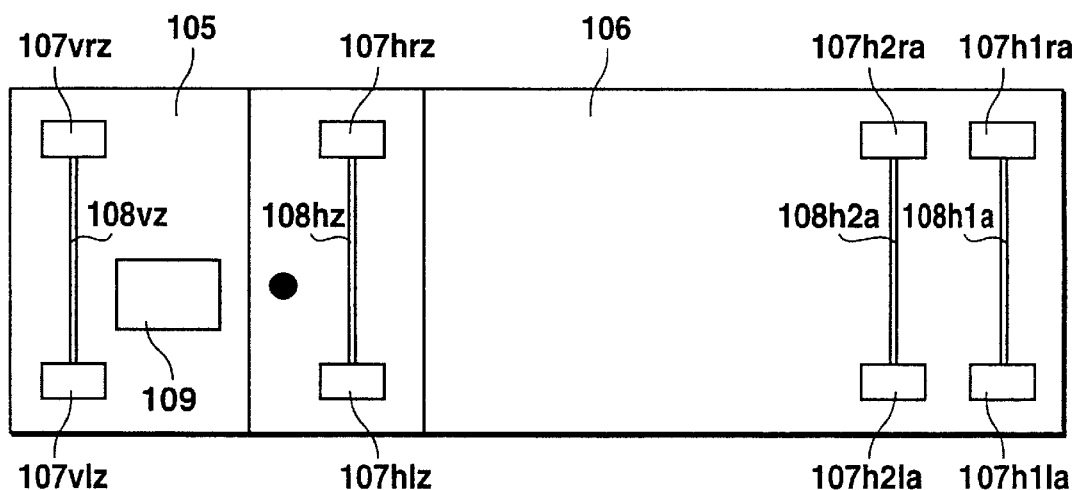
FIG. 1b shows a vehicle combination for which the method according to the present invention may be used.
Figure 1C:
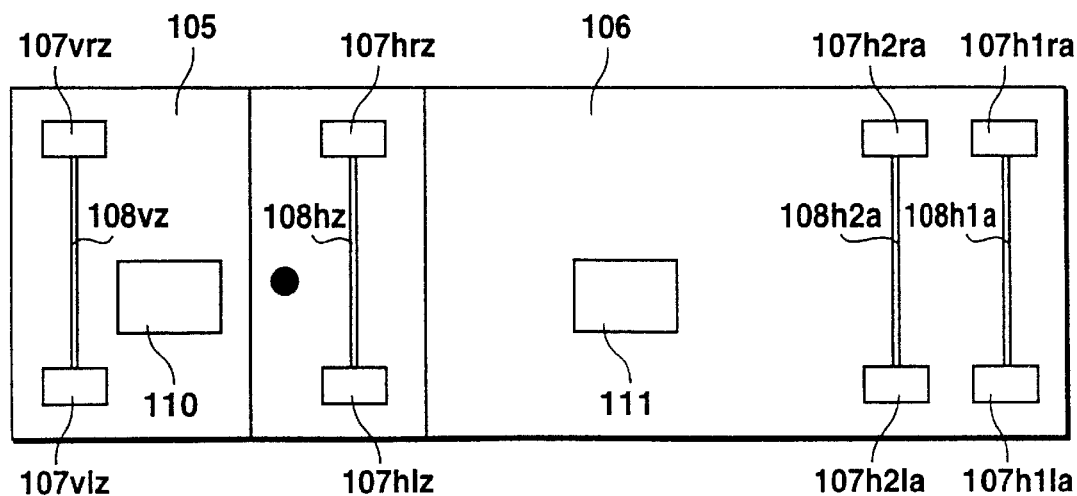
FIG. 1c shows the vehicle combination with two control devices for which the method according to the present invention may be used.

FIGS. 1a, 1b, and 1c, which depict various road vehicles in which the method according to the present invention can be used, will first be discussed.

FIG. 1a depicts a one-piece vehicle 101. This can be either a passenger car or a commercial vehicle. The one-piece vehicle 101 depicted in FIG. 1a is assumed to be a vehicle having at least two wheel axles, as indicated by the partially dashed-line depiction. The wheel axles of vehicle 101 are designated as 103$ix$, in which index i identifies either a front axle (v) or a rear axle (h). In vehicles having more than two axles, index x identifies the particular one of the front or rear axles. The allocation is as follows: the front axle or rear axle that is closest to the vehicle periphery is always assigned the lowest value of index x. The farther away the particular wheel axis is located from the vehicle periphery, the greater the value of the associated index x. Wheels 102$ixj$ are associated with wheel axles 103$ix$. The meaning of indices i and x is the same as described above. Index j indicates whether the wheel is located on the right side (r) or left side (1) of the vehicle. In the presentation of wheels 102$ixj$, no distinction was made between individual wheels and twin wheels. Vehicle 101 also contains a control device 104 in which the apparatus according to the present invention for carrying out the method according to the present invention is implemented.

To illustrate the depiction selected in FIG. 1a, let the following be set forth as an example: A two-axle vehicle contains a front axle 103$v$1 with wheels 102$v$1$r$ and 102$v$1$l$ associated with it, and a rear axle 103$h$1 with wheels 102$h$1$r$ and 102$h$1$l$ associated with it. A three-axle vehicle normally has a front axle 103$v$1 with wheels 102$v$1$r$ and 102$v$1$l$, and a first rear axle 103$h$1 with wheels 102$h$1$r$ and 102$h$1$l$ and a second rear axle 103$h$2 with wheels 102$h$2$r$ and 102$h$2$l$.

FIG. 1b depicts a vehicle combination comprising a tractor 105 and a trailer 106. The depiction selected is not intended to constitute any limitation; a vehicle combination comprising a tractor and a drawbar trailer is, for example, also contemplated by the present invention. Tractor 105 is assumed to have wheel axles 108$iz$. Associated with wheel axles 108*iz* are the corresponding wheels 107*ijz*. The significance of indices i and j corresponds to that already described in conjunction with FIG. 1*a*. Index z indicates that wheel axles and wheels of the tractor are involved. In addition, tractor 105 has a control device 109 with which a tilt tendency of tractor 105 and/or a tilt tendency of trailer 106 and/or a tilt tendency of the entire vehicle combination about a vehicle axis oriented in the longitudinal direction can be detected. Trailer 106 is assumed to contain two wheel axles 108*ixa*. Wheels 107*ixja* are allocated correspondingly to the two wheel axles 108*ixa*. The significance of indices i, x, and j corresponds to that already presented in conjunction with FIG. 1*a*. Index a indicates that components of trailer 106 are involved. The number of wheel axles depicted in FIG. 1*b* for tractor 105 and trailer 106 is not intended to constitute any limitation. Control device 109 can also be arranged in trailer 106 instead of in tractor 105.

FIG. 1*c* depicts a vehicle combination corresponding to the vehicle combination depicted in FIG. 1*b*. The tractor, trailer, wheel axles, and wheels are therefore identified with the same reference characters. A difference between FIG. 1*c* and FIG. 1*b* lies in the fact that the vehicle combination according to FIG. 1*c* has two control devices. A control device 110 according to the present invention is associated with tractor 105. A control device 111 according to the present invention is associated with trailer 106. A method for detecting a tilt tendency according to the present invention is executed in both control devices.

The labeling with indices a, i, j, x, and z selected in FIGS. 1*a*, 1*b*, and 1*c* is analogous for all variables and components in which it is used.

Three exemplary embodiments which refer back to the various vehicles depicted in FIGS. 1*a*, 1*b*, and 1*c* will be discussed below with reference to FIGS. 2*a*, 2*b*, and 2*c*. The apparatus according to the present invention implemented, for vehicle 101 depicted in FIG. 1*a*, in the associated control device 104 is described with reference to FIG. 2*a*. The apparatus according to the present invention implemented, for the vehicle combination depicted in FIG. 1*b*, in the associated control device 109 is described with reference to FIG. 2*b*. In the vehicle combination depicted in FIG. 1*c*, tractor 105 has a separate control device 110 and trailer 106 a separate control device 111. The coaction of the two control devices 110 and 111 is described with reference to FIG. 2*c*.

The first exemplary embodiment will be described first, with reference to FIG. 2*a*.

The vehicle on which the first exemplary embodiment is based is, as depicted in FIG. 1*a*, a one-piece vehicle. It is further assumed that this one-piece vehicle has at least two wheel axles 103*ix*. These two wheel axles are assumed to be front axle 103*v*1 with wheels 102*v*1*r* and 102*v*1*l*, and rear axle 103*h*1 with wheels 102*h*1*r* and 102*h*1*l*. Wheel rotation speed sensors 201*v*1*r*, 201*v*1*l*, 201*h*1*r*, and 201*h*1*l* belonging to these wheels are depicted in FIG. 2*a*. As indicated in FIG. 2*a*, further wheel rotation speed sensors 201*ixj* can be taken into account depending on the number of wheel axles of the one-piece vehicle. Wheel rotation speed sensors 201*ixj* ascertain the variables nixj which describe the wheel rotation speed of each of the corresponding wheels 102*ixj*. Wheel rotation speed sensors 201*ixj* are present in all cases regardless of the type of controller 209, and variables nixj generated with them are conveyed in all cases to blocks 205 and 209 regardless of the type of controller 209 implemented in the apparatus according to the present invention.

A variety of sensors are available, depending on the type of controller 209 implemented in the apparatus according to the present invention. If controller 209 is a braking slip controller which intervenes on the wheel brakes on the basis of the control operation executing in it, and/or if controller 209 is an automatic slip controller which intervenes on the wheel brakes and/or the engine on the basis of the control operation executing in it, wheel rotation speed sensors 201*ixj*, as already indicated above, are present in all cases. In this case, however, transverse acceleration sensor 202, yaw rate sensor 203, and steering angle sensor 204 are not present. In such cases, if the transverse acceleration and/or the yaw rate of the vehicle and/or the steering angle are used, these variables must consequently be derived in a conventional fashion, from wheel rotation speeds nixj, in controller 209 and in block 206. In this case, the inputs shown in FIG. 2*a* for block 206 of variables aq, delta, and omega are to be replaced by input of variables nixj. Be it noted at this juncture that no such depiction has been made in FIG. 2*a*, although this is not intended to constitute any limitation.

Figure 2A:
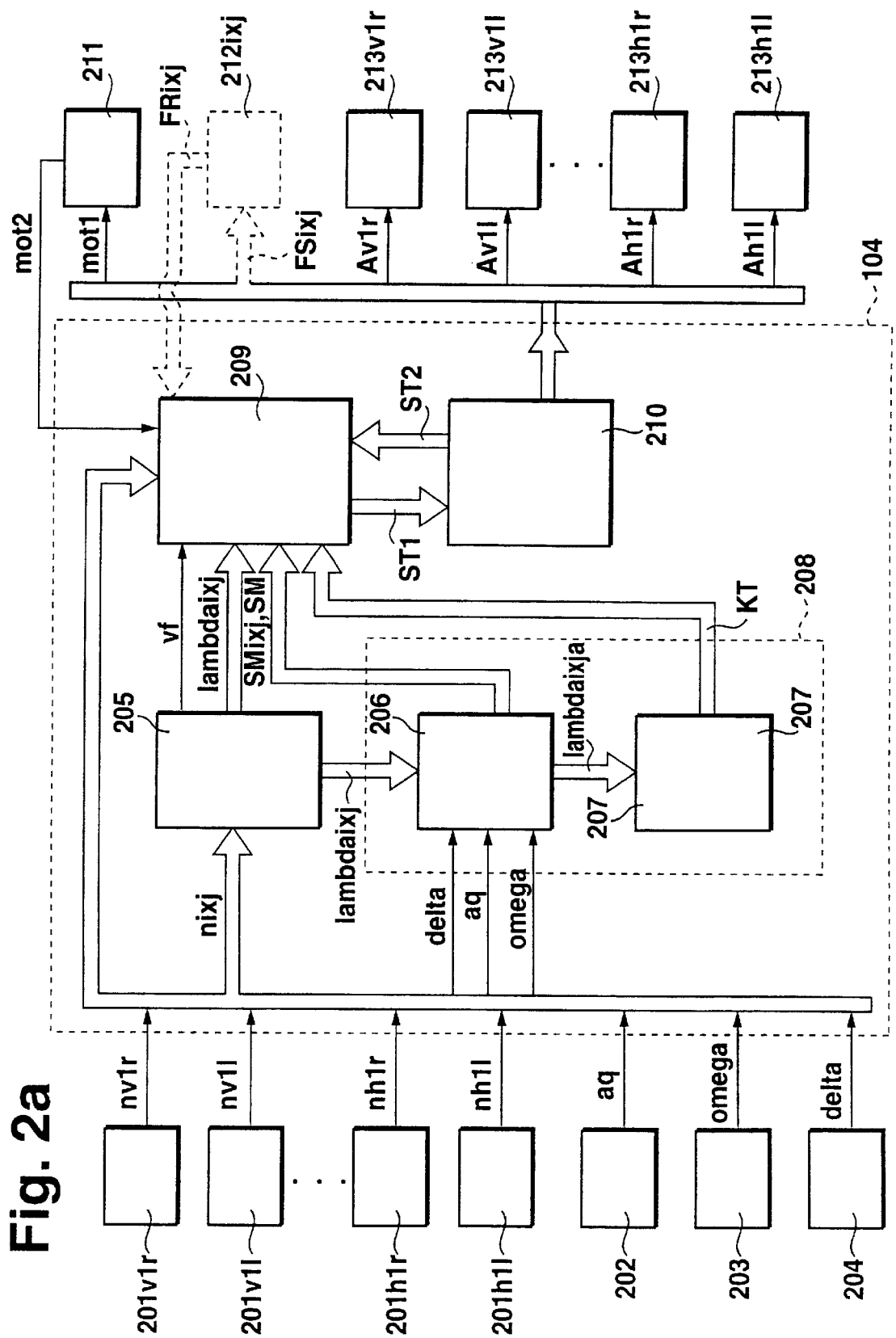
FIG. 2a shows the general arrangement of a device according to the present invention for the one-piece vehicle.
Figure 2B:
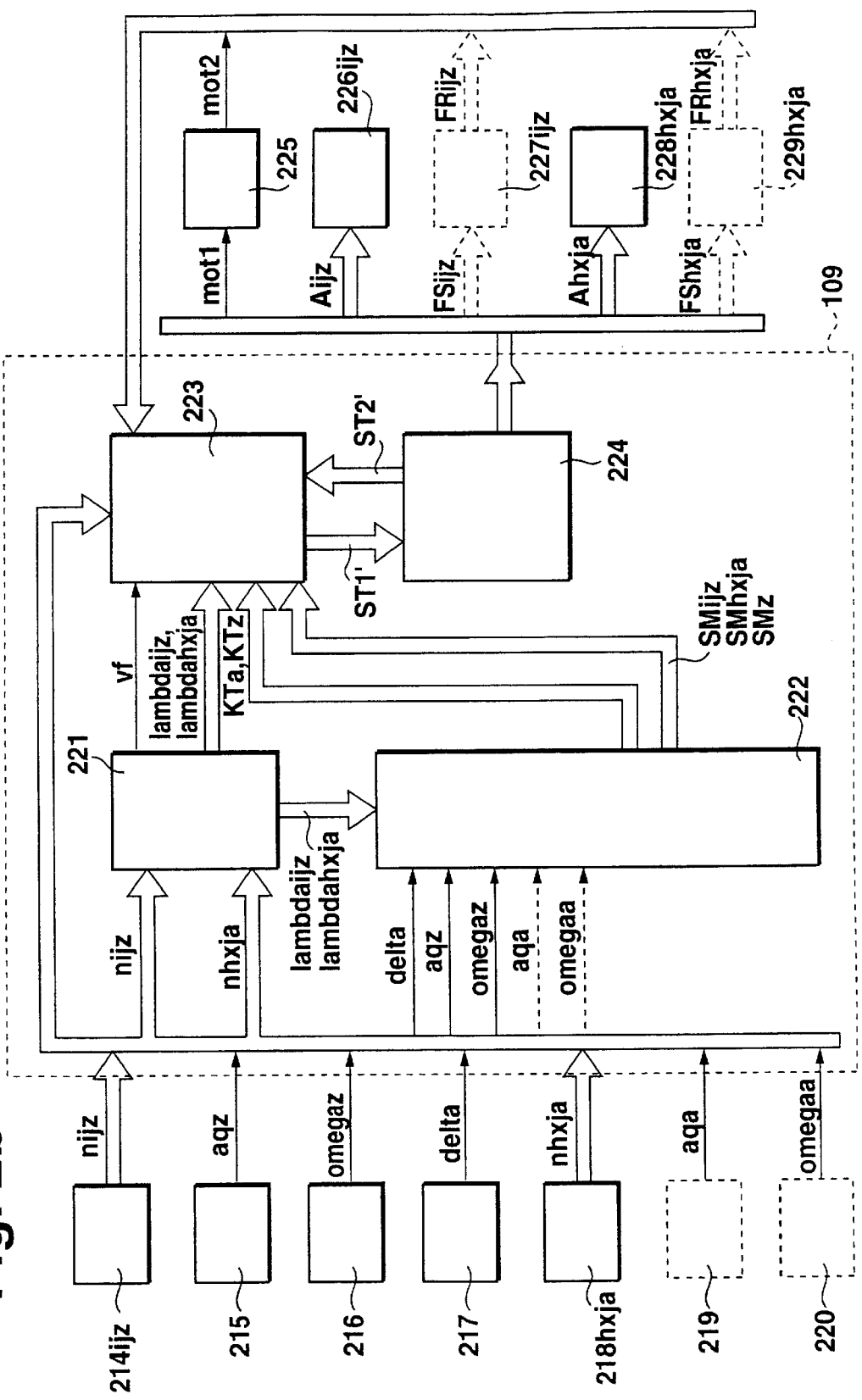
FIG. 2b shows the general arrangement of the device according to the present invention for the vehicle combination.

If, on the other hand, controller 209 is a controller whose basic function is to regulate a variable describing the vehicle dynamics, for example, a variable dependent on the transverse acceleration and/or yaw rate of the vehicle, by interventions on the wheel brakes and/or on the engine ( a conventional controller being described, for example, in the publication "FDR—die Fahrdynamikregelung von Bosch" which appeared in Automobiltechnische Zeitschrift (ATZ) 16, 1994, Vol. 11, on pages 674 through 689), then as shown in FIG. 2*a*, a transverse acceleration sensor 202, a yaw rate sensor 203, and a steering angle sensor 204 are also present in addition to wheel rotation speed sensors 201*ixj*. In this case, the variables ascertained with the corresponding sensors can be processed in controller 209 and in block 206. This case is depicted in FIG. 2*a*. Be it noted at this juncture that in this case, if the transverse acceleration sensor and/or yaw rate sensor and/or steering angle sensor should fail, the corresponding variable can also be derived from the wheel rotation speeds.

The depiction shown in FIG. 2*a* is not intended to constitute any limitation. Slight modifications may be necessary depending on the type of controller implemented.

It will be assumed hereinafter that vehicle 101 contains a transverse acceleration sensor 202, a yaw rate sensor 203, and a steering angle sensor 204. Be it further noted at this juncture that the use of transverse acceleration sensor 202 and that of yaw rate sensor 203 and that of steering angle sensor 204 is not intended to constitute any limitation. The corresponding variables can also be ascertained on the basis of variables nixj.

The variable aq describing the transverse acceleration of the vehicle which is ascertained by way of transverse acceleration sensor 202, the variable omega describing the yaw rate of the vehicle which is ascertained by way of yaw rate sensor 203, and the variable delta describing the steering angle of the vehicle which is ascertained by way of the steering angle sensor, are conveyed to blocks 206 and 209.

In block 205, a variable vf describing the vehicle speed is ascertained in a conventional fashion from variables nixj. This variable vf is conveyed from block 205 to block 209. Also in block 205, on the basis of variables nixj and variable vf, variables lambdaixj which describe the drive slip or braking slip of the wheels are ascertained in a conventional fashion. These variables lambdaixj are conveyed from block 205 both to block 206 and to block 209.

Block 206 identifies, on the one hand, which wheels of the vehicle are threatening to lift off based on the vehicle state. In other words, those wheels which are suitable for detecting a tilt tendency of the vehicle about a vehicle axis oriented in the longitudinal direction of the vehicle are identified.

Identification of these wheels is made at least as a function of one of the ascertained variables delta or aq or omega, representing the transverse dynamics of the vehicle, which are conveyed to block 206. For this purpose, a determination is made in block 206, from variable delta describing the steering angle and/or from variable aq describing the transverse acceleration of the vehicle and/or from variable omega describing the yaw rate of the vehicle, of a variable from which it is possible to detect when the vehicle is traveling through a curve, and its nature, i.e., left-hand or right-hand curve. Reference is made at this juncture, by way of example, to German Patent No. 39 33 653, which describes a curve detection system based on the steering angle or transverse acceleration of the vehicle. A curve detection system based on the yaw rate of the vehicle is contemplated by the present invention as an alternative thereto.

In principle, it is sufficient to identify the wheels on the inside of the curve, since in a tilting event the vehicle wheels on the inside of the curve usually are the first to lift off, and since an incipient tilting event of a vehicle is "announced" by liftoff of the wheels on the inside of the curve. A refinement of the determination, such that a determination is made as to whether the front wheel or rear wheel on the inside of the curve is more strongly threatening to lift off, is contemplated by the present invention. This is significant given that depending on the vehicle geometry and/or the vehicle loading, the front or rear wheel on the inside of the wheel is more likely to lift off. If a refined determination of this kind is to be made, analysis only of, for example, the steering angle is no longer sufficient. What must be done in this case, as described above, is to ascertain a variable which, for example, depends on the steering angle, the transverse acceleration of the vehicle, and the yaw rate of the vehicle. The variables (lambdaixja) ascertained for the wheels threatening to lift off are labeled in FIG. 2a with the added index "a".

Also in block 206, if the wheels threatening to lift off are known, signals SMixj and SM are generated, based on which braking torques and/or drive torques are briefly generated and/or modified at at least one of the wheels threatening to lift off. Since the wheels threatening to lift off react sensitively to changes in wheel dynamics, it is possible to determine, for example, by analyzing the slip values of the wheels threatening to lift off, whether or not a tilt tendency exists for the vehicle.

It is furthermore contemplated by the present invention, in identifying the wheels of the vehicle which are threatening to lift off and which are thus suitable for detecting a tilt tendency of the vehicle, and/or in briefly generating and/or modifying the braking torques and/or drive torques at at least one wheel, additionally, to take into account the drive concept of the vehicle, i.e., whether it is a vehicle with front-wheel, rear-wheel, or all-wheel drive. This can be achieved, for example, by correspondingly influencing variables SMixj and SM.

If individual braking interventions on the vehicle wheels are not possible, perhaps because the braking system implemented does not allow them or because it is not possible because of an existing vehicle state, then identification of the wheels threatening to lift off is omitted In this case. In this case braking torques and/or drive torques are briefly generated and/or modified simultaneously at all the wheels of the vehicle.

Variables SMixj and SM generated in block 206 are conveyed to block 209. Actuators 213ixj, which are associated with the wheels and with which braking torques can be generated, are activated on the basis of variables SMixj. A means which is associated with engine 211, and with which the torque delivered by the engine can be influenced, is activated on the basis of variable SM. Variables SMixj and SM are generated in block 206 in such a way that a braking torque and/or a drive torque is briefly generated and/or modified at the respective wheels threatening to lift off. In this context, by suitable activation of actuator 213ixj associated with the respective wheel that is threatening to lift off, a slight braking torque is built up and/or there is a slight change in a previously generated braking torque. In this context, by suitable activation of the means associated with the vehicle engine and of actuators 213ixj associated with the wheels, a slight drive torque is generated and/or there is a slight change in a previously generated drive torque.

The slip values lambdaixja of the wheels threatening to lift off are conveyed from block 206 to a block 207.

The two blocks 206 and 207 may be combined according to the present invention into one block 208.

Be it noted at this juncture that it is also possible to use as the variable quantitatively describing the wheel behavior, alternatively to the variable describing the slip of the respective wheel, either the variable which itself describes the wheel rotation speed and/or a variable which describes the change over time in the wheel rotation speed.

In block 207, based on the variables lambdaixja conveyed to it, the determination is made as to whether a tilt tendency of the vehicle about a vehicle axis oriented in the longitudinal axis of the vehicle is present. This is done by first determining, for at least one wheel which is threatening to lift off, the change deltalambdaixja in the corresponding variable which quantatively describes the wheel behavior. In this context, the change deltalambdaixja is determined during the time period in which the braking torques and/or drive torques are being briefly generated and/or modified at the respective wheel, and/or after the braking torques and/or drive torques have been briefly generated and/or modified at the respective wheel. Initial reference is made at this juncture, in conjunction with the determination of variable deltalambdaixja, to FIG. 4 (yet to be described).

As a function of the change deltalambdaixja in the variable quantitatively describing the wheel behavior, a determination is made as to whether a tilt tendency exists for the vehicle. If the magnitude of variable deltalambdaixja is greater than a corresponding threshold value, a tilt tendency of the vehicle is present. In this case a variable KT is generated in block 207 and is conveyed from block 207 to block 209. This variable KT informs the controller or vehicle controller 209 as to whether or not a tilt tendency of the vehicle exists.

The controller or vehicle controller implemented in control device 104 is labeled 209. Controller 209 is, for example, a controller whose basic function is to regulate, by interventions on the wheel brakes and/or the engine, a variable describing the dynamics of the vehicle, for example, a variable dependent on the transverse acceleration and/or the yaw rate of the vehicle. A conventional controller is described, for example, in the publication "FDR—die Fahrdynamikregelung von Bosch" which appeared in Automobiltechnische Zeitschrift (ATZ) 16, 1994, Vol. 11, on pages 674 through 689. The control action taking place in block 209 as its basic function is based in a conventional fashion on the variables nixj, delta, aq, omega, vf, lambdaixj conveyed to block 209; on a variable mot2 which, for example, describes the engine speed of engine 211 and which is conveyed from engine 211 to block 209; and on variables ST2 which are conveyed to block 209 from a block 210 which represents the activation logic for the actuators present in the vehicle.

Be it noted once again at this juncture that the control system described above for the basic function of the controller is not intended to constitute any limitation. It is also possible, alternatively to this control system, for the basic function implemented in controller 209 also to be a braking slip control system which intervenes on the wheel brakes and/or an automatic slip control function which intervenes on the wheels brakes and/or on the engine.

In addition to the control action implemented as the basic function in block 209, a tipover prevention system is implemented therein. The controller may perform two tasks in the context of the tipover prevention system. On the one hand, it converts variables SMixj and SM into corresponding signals ST1, which are conveyed to activation logic 210 and on the basis of which braking torques and/or drive torques are briefly generated and/or modified at the wheels threatening to lift off. On the other hand, it implements the actual tipover prevention system based on variables KT conveyed to it. This tipover prevention system can be on a higher level than the basic control function.

By way of variables KT, on the one hand, controller 209 can be informed that a tilt tendency of the vehicle about a vehicle axis oriented in the longitudinal direction of the vehicle is present, and, in addition controller 209 can be informed of the intensity of that tendency, or of how and at which wheels the vehicle is threatening to tilt.

Controller 209 generates variables ST1 which are conveyed to activation logic 210 with which the actuators associated with the vehicle are activated. Variables ST1 inform activation logic 210 as to which actuators are to be activated, and how. Variables ST1 are generated in controller 209, for example, as follows: If no tilt tendency exists for the vehicle, and if no short-term influences, according to the present invention, are to be performed on the wheel torque values, variables ST1 are generated in accordance with the control system implemented for the basic function. In the case, for example, of a control system described in the publication "FDR—die Fahrdynamikregelung von Bosch" cited above, variables ST1 thus contain information as to which wheel or wheels are to be braked and in what fashion, or the extent to which the torque delivered by the engine is to be influenced. If a tilt tendency exists for the vehicle, or if short-term influences, according to the present invention, are to be performed on the wheel torques, two procedures for creating variables ST1 are possible. On the one hand, variables ST1*, which have been determined in accordance with the control concept implemented for the basic function, are modified so that tipover of the vehicle about a vehicle axis oriented in the longitudinal direction of the vehicle is prevented, or so that the brief actions according to the present invention which influence the wheel torques are performed. On the other hand, the variables ST1* determined in accordance with the control concept implemented for the basic function can be replaced by variables which are generated in order to prevent tipover of the vehicle or in order to perform the brief actions according to the present invention which influence the wheel torques.

The following interventions, for example, on the actuators of the vehicle are possible in order to prevent tipover of the vehicle about a vehicle axis oriented in the longitudinal direction of the vehicle: On the one hand, a reduction in the vehicle speed can be achieved by braking or by decreasing the engine torque. On the other hand, tipover of the vehicle can be counteracted in controlled fashion by braking interventions on individual wheels. For example, in a vehicle which is greatly understeering prior to tipover, and which is rolling over the front wheel on the outside of the curve upon tipover, a braking torque is generated at that front wheel on the outside of the curve by a controlled brake intervention. The slip conditions at that wheel are thereby changed in such a way that only minor lateral forces are transferred, and the tipover risk is thus reduced.

A rolling motion of the vehicle can also be limited by interventions on the chassis actuators associated with the vehicle.

In block 210, i.e., the activation logic, the variables ST1 generated by controller 209 are converted into activation signals for engine 211 and into activation signals for the actuators of the vehicle. The actuators are, for example, chassis actuators 212ixj with which the behavior of the chassis can be influenced, and actuators 213ixj with which a braking force can be generated at the corresponding wheels. To activate engine 211, the activation logic generates a signal motl with which, for example, the throttle valve position of the engine can be influenced. To activate chassis actuators 212ixj, activation logic 210 generates signals Fsixj with which the damping or stiffness implemented by chassis actuators 212ixj can be influenced. To activate actuators 213ixj, which are configured in particular as brakes, activation logic 210 generates signals Aixj with which the braking forces generated by actuators 213ixj at the corresponding wheels can be influenced. Activation logic 210 generates variables ST2 which are conveyed to controller 209 and which contain information concerning activation of the individual actuators.

Chassis actuators 212ixj influence the chassis of the vehicle. Signals Frixj are conveyed from chassis actuators 212ixj to controller 209 so that the controller recognizes the current status of chassis actuators 212ixj.

Be it noted at this juncture that in addition to the actuators depicted in FIG. 2a, the use of so-called retarders is also possible.

The braking system used in FIG. 2a can be a hydraulic or pneumatic or electrohydraulic or electropneumatic braking system.

A second exemplary embodiment, based on the vehicle combination depicted in FIG. 1b, will be described with reference to FIG. 2b. In the description of the components depicted in FIG. 2b, reference is made where possible to the description associated with FIG. 2a. It is also true for FIG. 2b that, for example, the transverse acceleration and/or yaw rate and/or steering angle can be derived from the wheel rotation speeds. No depiction thereof has been made in FIG. 2b.

Analogously with the depiction in FIG. 2a, tractor 105 is equipped with wheel rotation speed sensors 214ijz, a transverse acceleration sensor 215, a yaw rate sensor 216, and a steering angle sensor 217. Trailer 106 is assumed to be equipped at least with wheel rotation speed sensors 218hxja. The trailer can additionally be equipped with a transverse acceleration sensor 219 and a yaw rate sensor 220. Normally, i.e., in a steady-state operating condition, transverse acceleration sensor 219 and yaw rate sensor 220 would not be necessary for trailer 106, since the transverse acceleration acting on trailer 106 and the yaw rate occurring at trailer 106 correspond in each case to the transverse acceleration and yaw rate of tractor 105. In a non-steady-state operating condition, both the transverse acceleration and the yaw rate of trailer 106 can be determined in known fashion from the wheel rotation speeds of the trailer. For this reason, both transverse acceleration sensor 219 and yaw rate sensor 220 are depicted with dashed lines in FIG. 2b.

Block 221 corresponds in terms of its function to block 205 depicted in FIG. 2a. Block 222 corresponds in terms of its function to blocks 206 and 207 that are combined, in FIG. 2a, into block 208. Block 223 corresponds in terms of its function to block 209 depicted in FIG. 2a. Block 224 corresponds in terms of its function to block 210 depicted in FIG. 2a. The variables nijz, aqz, omegaz, and delta determined for tractor 105 are conveyed, as described in conjunction with FIG. 2a, in corresponding fashion to blocks 221, 222, and 223. Proceeding from the depiction in FIG. 2a, additional consideration is to be given, as far as sensors are concerned, to the sensors for trailer 106. The variables nhxja, aqa, and omegaa generated using sensors 218$hxja$, 219, and 220 for the trailer are processed in control device 109 in a manner analogous to variables nijz, aqz, and omegaz generated for trailer 105. This means that variables nhxja are conveyed both to block 221 and to block 223. Variables aqa and omegaa, if present, are conveyed to blocks 222 and 223.

In block 221, analogously to block 205, a variable vf describing the speed of the vehicle combination is ascertained on the basis of variables nijz and nhxja. Also in block 221, in a manner similar to block 205, variables lambdaijz and lambdahxja are ascertained, and are conveyed both to block 222 and to block 223. In block 222, corresponding to the procedure in block 208, a determination is made as to whether a tilt tendency exists for the vehicle combination and/or for tractor 105 and/or for trailer 106. For this purpose, in block 222 the wheels threatening to lift off are identified for both the wheels of tractor 105 and for the wheels of trailer 106, and corresponding signals SMijza, SMhxjaa are generated and conveyed to block 223. Also in block 222, a determination is made, for the wheels threatening to lift off, of the changes in the variables describing the wheel behavior of the respective wheel. The result of the tilt tendency detection operation is conveyed from block 222 to block 223 via variables KTz and KTa. Variable KTz contains the information for tractor 105, and variable KTa the information for the trailer.

Corresponding to the procedure described in conjunction with block 209, in block 223 variables ST1' are determined and are conveyed to activation logic 224. Corresponding to FIG. 2a, in block 224 variables ST2' are determined and are conveyed to controller 223. Based on variables ST1' conveyed to block 224, in block 224 the activation signals for the engine and the activation signals for the actuators are determined. Corresponding to FIG. 2a, these are the following activation signals for tractor 105: For engine 225, activation signal motl is determined. For actuators 226$ijz$ with which braking forces can be generated, activation signals Aijz are determined. For any chassis actuators 227$ijz$ that may be associated with the tractor, activation signals Fsijz are determined. Additionally determined in activation logic 224 are activation signals Ahxja for actuators 228$hxja$ contained in the trailer, with which braking forces can be generated. If the trailer has chassis actuators 229$hxja$, activation signals Fshxja for the chassis actuators are determined in activation logic 224. Corresponding to FIG. 2a, a variable mot2 from engine 225, variables Frijz from chassis actuators 227$ijz$, and variables Frhxja from chassis actuators 229$hxja$, are conveyed to controller 223.

Figure 2C:
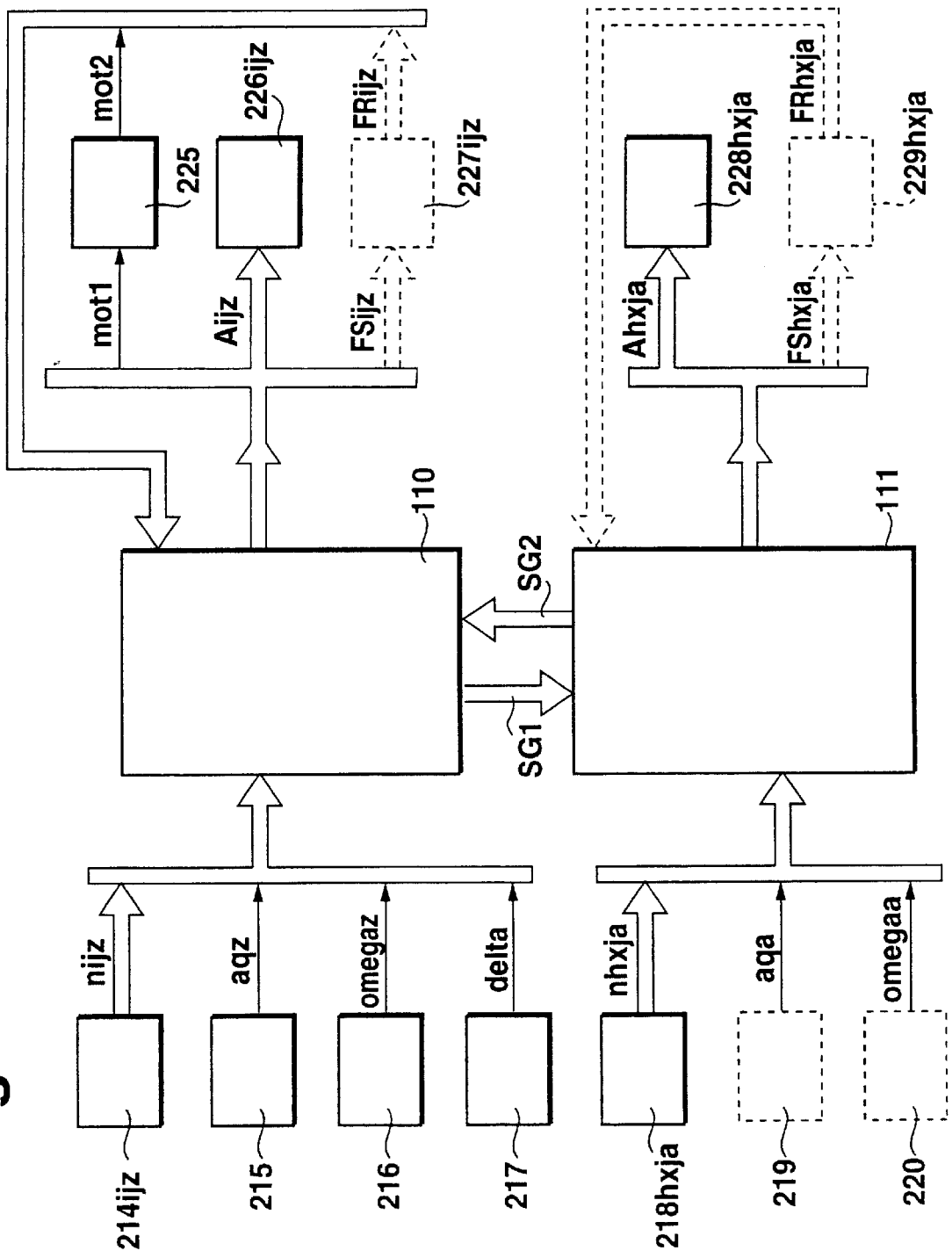
FIG. 2c shows the general arrangement of the device according to the present invention for the vehicle combination with two control devices.

FIG. 2c illustrates a third exemplary embodiment based on the vehicle combination depicted in FIG. 1c. In this exemplary embodiment, tractor 105 is assumed to be equipped with a control device 110, and trailer 106 with a control device 111. Be it noted at this juncture that the functions of components and the significance of variables that are used in FIG. 2c and have already been depicted in FIG. 2b are similar. Regarding control devices 110 and 111, the delivery of input variables and the output of output variables may be deduced from FIGS. 2a and 2 b. Control device 110 corresponds substantially to control device 104 depicted in FIG. 2a. In order to arrive at control device 110, control device 104 in controller 209 must be modified so that it can determine and output additional variables SG1, and can receive and process additional variables SG2. Control device 111 is also derivable from control device 104 in FIG. 2a. This is done by changing controller 209 in such a way that it can determine and output additional variables SG2, and can receive and process additional variables SG1. Since the trailer has as actuators only brakes 228$hxja$ and chassis actuators 229$hxja$, controller 209 and activation logic 210 depicted in FIG. 2a must also be modified accordingly.

Since the vehicle combination has two separate control devices 110 and 111, for coordination of the two control devices an exchange of data or variables SG1 and SG2 is necessary in order to coordinate the interventions of the two control devices. Information can be exchanged, for example, via variables SG1 and SG2 as to which actuators are being actuated in each case. Alternatively, however, it is also possible for the two control devices 110 and 111 to operate autonomously. In this case, no exchange of data or variables SG1 and SG2 between the two control devices is necessary.

Figure 3:
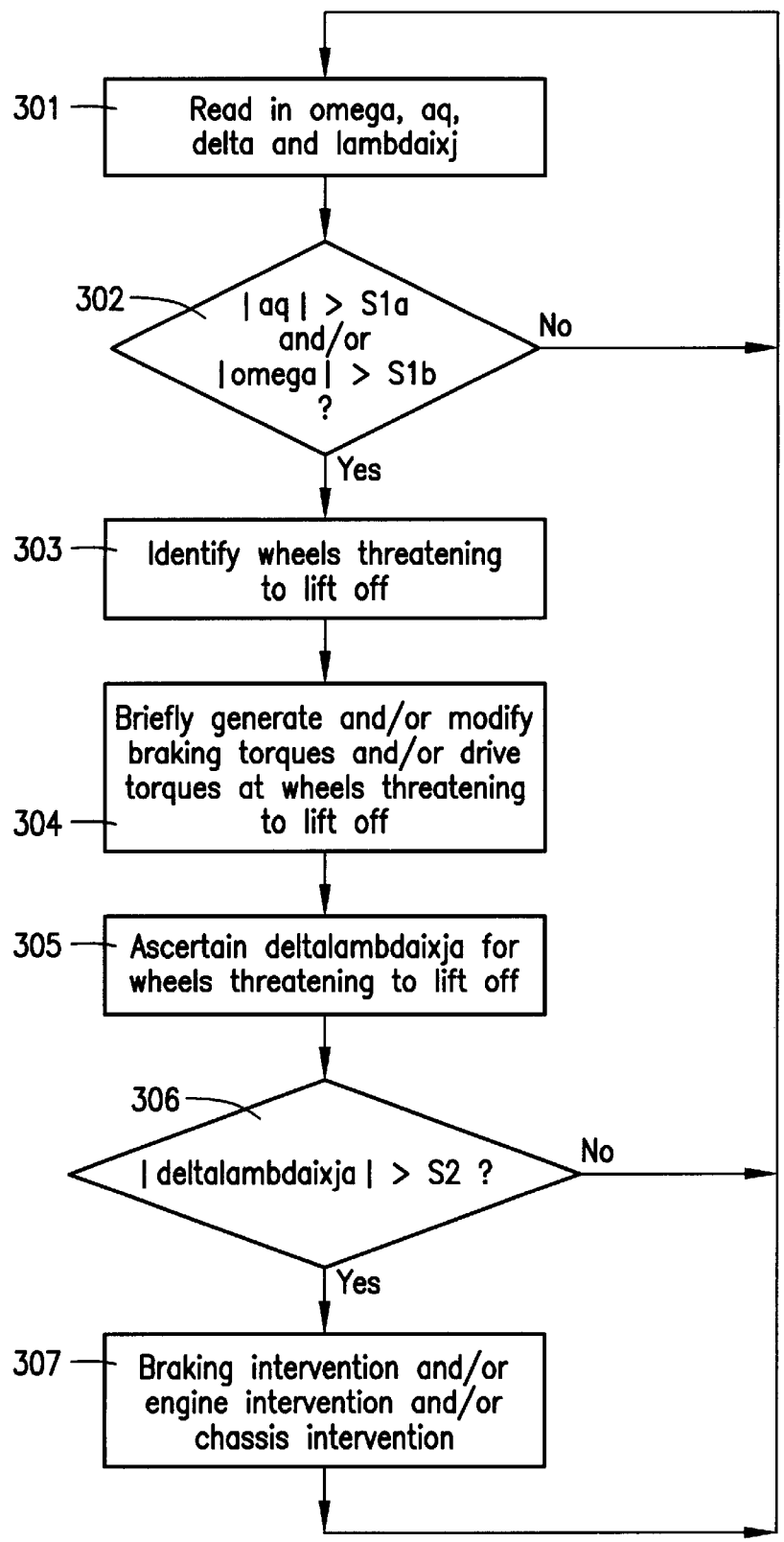
FIG. 3 shows a flowchart illustrating the method according to the present invention.

The flow chart depicted in FIG. 3 will be used to depict the execution of the method according to the present invention, as implemented in block 208 of the exemplary embodiment depicted in FIG. 2a, which is based on the one-piece vehicle depicted in FIG. 1a. No limitation of the present invention is to be construed from the fact that FIG. 3 deals only with a one-piece vehicle. The flow diagram depicted in FIG. 3 is also applicable in corresponding fashion to a vehicle combination.

The method according to the present invention begins with a step 301 in which the variables omega, aq, delta, and lambdaixj are read in. Variables omega, aq, and delta have been either sensed by way of sensors or derived from the wheel rotation speeds. Subsequent to step 301, a step 302 is performed.

The query taking place in step 302 determines whether a vehicle condition is present in which a tilt tendency of the vehicle about a vehicle axis oriented in the longitudinal axis of the vehicle can occur. To do so, in step 302 a determination is made as to whether the magnitude of variable aq, which describes the transverse acceleration of the vehicle, is greater than a first threshold value S1a, and/or whether the magnitude of variable omega, which describes the yaw rate of the vehicle, is greater than a second threshold value S1b. It would moreover also be possible to determine, for example, the difference in wheel speeds between the left and the right wheel for one wheel axle, and to compare that difference to a suitable threshold value.

The reasons for the alternative connection of the two subqueries in step 302 are as follows: on the one hand, it may be the case that either variable aq describing the transverse acceleration or variable omega describing the yaw rate is conveyed to block 206. In this case, necessarily only one of the two subqueries can be performed. On the other hand, it may happen that both variables are conveyed to block 206. In this case one of the two subqueries can be selectably performed, or, in order to make the conclusion more reliable, both subqueries can be performed simultaneously. If at least one of the two subquery conditions is met in step 302, then a step 303 is performed subsequent to step 302. If, on the other hand, neither of the two subquery conditions is met in step 302, then step 301 is performed again subsequent to step 302.

As already described above, in step 303 the wheels of the vehicle threatening to lift off are identified, i.e., those wheels of the vehicle which are suitable for detecting a tilt tendency of the vehicle are identified.

In principle, it is sufficient to identify the wheels on the inside of the curve, since in a tilting event the wheels of the vehicle on the inside of the curve are normally the first to lift off. A refinement of the determination, such that a determination is made as to whether the front wheel or rear wheel on the inside of the curve is more strongly threatening to lift off, is also contemplated by the present invention.

Following step 303, a step 304 is performed. In this step 304, braking torques and/or drive torques are briefly generated and/or modified at at least one of the wheels threatening to lift off. For this purpose, variables SMixj and SM generated by block 206 are converted in controller 209 and in activation logic 210 into corresponding activation signals.

By suitable activation of actuator 213*ixj* associated with the respective wheel threatening to lift off, a slight braking torque is built up and/or there is a slight change in a previously generated braking torque. By suitable activation of the means associated with the vehicle engine and of actuators 213*ixj* associated with the wheels, a slight drive torque is generated and/or there is a slight change in a previously generated drive torque.

For the situation in which individual interventions cannot be performed on the wheels of the vehicle, braking torques and/or drive torques can be briefly generated and/or modified at all the wheels of the vehicle.

Subsequent to step 304, a step 305 is performed. In this step 305, the change deltalambdaixja in the variable quantitatively describing the wheel behavior is determined for each of the wheels threatening to lift off. The variable describing the change deltalambdaixja is determined during the time period in which the braking torques and/or the drive torques are being briefly generated and/or modified at the respective wheel, and/or after the braking torques and/or drive torques have been briefly generated and/or modified at the respective wheel. Reference is made at this juncture to FIG. 4 (yet to be described). Subsequent to step 305, a step 306 is performed.

In step 306, a determination is made, as a function of variable deltalambdaixja, as to whether a tilt tendency for the vehicle about a vehicle axis oriented in the longitudinal direction of the vehicle is present. A tilt tendency exists if the magnitude of variable deltalambdaixja is greater than a corresponding threshold value S2. In this case, a step 307 is performed subsequent to step 306.

If, on the other hand, the magnitude of variable deltalambdaixja is less than threshold value S2, which is thus equivalent to saying that no tilt tendency exists, then step 301 is performed again subsequent to step 306.

In step 307, based on the fact that a tilt tendency of the vehicle about a vehicle axis oriented in the longitudinal direction of the vehicle is present, braking interventions and/or engine interventions and/or interventions on chassis actuators, with which stabilization of the vehicle can be achieved, are performed. The braking interventions, i.e., the interventions on actuators 213*ixj*, and the engine interventions serve principally to reduce the vehicle speed. In addition, stabilizing yaw moments can be generated in known by way of braking interventions on individual wheels. Reference is made here to the braking of the front wheel on the outside of the curve as described above. By way of the interventions on chassis actuators 212*ixj*, the roll motion of the vehicle can be partially compensated for and the position of the center of gravity can be influenced.

Subsequent to step 307, step 301 is performed again.

FIG. 4 depicts, for a wheel threatening to lift off, the correlation between the generation and/or modification of a torque Mixja acting on the wheel, and the resulting influence on variable lambdaixja which quantitatively describes the wheel behavior. If this torque is a braking torque, variable lambdaixja then represents the brake slip. If it is a drive torque, variable lambdaixja then represents the drive slip. As is evident from FIG. 4, generation and/or modification of the torque acting on the wheel results in an increase in the corresponding slip variable.

It will be assumed hereinafter that generation and/or modification of the torque begins at time t1 and ends at time t2. The change in the variable quantitatively describing the wheel behavior could be ascertained in the following ways: On the one hand, the resulting change can be determined during the time period which is defined by t1 and t2, based on the values lambda11 through lambda14 which exist at times t11 through t14. For example, the gradient of the variable lambdaixja quantitatively describing the wheel behavior could be determined by taking into account several of these values. On the other hand, the resulting change can be determined from the values lambda1 and lambda2 after the corresponding torques have been generated and/or modified. The value lambda1 is stored temporarily in a memory medium for this purpose.

Be it noted at this juncture that the depiction selected in the drawings is not intended to have any limiting effect on the method or the apparatus according to the present invention.

In conclusion, the present invention may be summarized as follows: The method and apparatus according to the present invention refer to the detection of a tilt tendency of a vehicle about a vehicle axis oriented in the longitudinal direction of the vehicle. For this purpose, a determination is made as to whether one of the wheels of the vehicle is lifting off. The fact that one wheel on the vehicle is lifting off is characterized by the fact that the normal force transferred by the wheel goes to zero, and negligible or no peripheral forces, i.e., lateral or longitudinal forces, are being transferred through the tires onto the road surface. In this state, the slip conditions at the lifted-off wheel are particularly sensitive to changes in wheel dynamics. These correlations can advantageously be utilized in order to detect the lifting-off of a wheel. A controlled change in the wheel torque by increasing and/or modifying the drive torque and/or braking torque, effected by way of an intervention on the brakes of the vehicle and/or on the engine, results, by comparison with a heavily loaded wheel that is not lifting off, in a considerable change in slip at the wheel which is lifting off. This slip change can be used to detect a wheel that is lifting off, and thus to detect a tilt tendency of a vehicle about a vehicle axis oriented in the longitudinal direction of the vehicle.

Alternatively, the following procedure for detecting a tilt tendency of the vehicle about a vehicle axis oriented in the longitudinal axis of the vehicle is also contemplated by the present invention for a vehicle that is equipped with a braking slip controller. only the wheel rotation speeds or wheel velocities of the vehicle wheels are monitored. If unexpectedly large differences occur in the individual wheel velocities or wheel rotation speeds in the absence of any braking force action or any influence on the torque delivered by the engine, it can then be concluded that individual vehicle wheels have little or no contact with the road surface. If this state is present for an extended time, i.e., if individual wheels have no ground contact for a long period, or have only slight ground contact for a long period, a tilt tendency is very probable. Corresponding stabilization measures are thus instituted.

What is claimed is:

1. A method for detecting a tilt tendency of a vehicle about a vehicle axis, the vehicle axis being oriented in a longitudinal direction of the vehicle, the method comprising the steps of:
   (a) ascertaining, for at least one wheel, a variable describing a wheel rotation speed;
   (b) ascertaining at least on variable representing transverse dynamics of the vehicle;
   (c) at least one of generating and modifying at least one of a braking torque and drive torque at the least one wheel, the at least one of the generating and the modifying being a function of the at least one variable representing the transverse dynamics of the vehicle;
   (d) determining a variable describing quantitatively a wheel behavior for the at least one wheel at least one of during and after step (c), the variable describing quantitatively the wheel behavior being a function of at least the variable describing the wheel rotation speed for the at lest one wheel; and
   (e) determining whether the tilt tendency of the vehicle about the vehicle axis is present, the determining of whether the tilt tendency is present being a function of at least the variable describing quantitatively the wheel behavior for the at least one wheel.

2. The method according to claim 1, wherein the method is used for stabilizing the vehicle and the method further comprising the step of:
   performing, in order to stabilize the vehicle, at least one of a braking intervention on the at least one wheel, an engine intervention and an intervention on chassis actuators when the tilt tendency is present.

3. The method according to claim 1, wherein the method is used for preventing a tipover of the vehicle and further comprising the step of:
   performing, in order to prevent the vehicle from tipping over, at least one of a braking intervention on the at least one wheel, an engine intervention and an intervention on chassis actuators when the tilt tendency is present.

4. The method according to claim 2, wherein the performing of the braking intervention includes the step of performing a braking intervention at least on a front wheel on an outside of a curve so as to at least one of generate and increase a braking torque at the front wheel.

5. The method according to claim 3, wherein the performing of the braking intervention includes the step of performing a braking intervention at least on a front wheel on an outside of a curve so as to at least one of generate and increase a braking torque at the front wheel.

6. The method according to claim 1, wherein the determining of whether the tilt tendency is present includes the steps of:
   comparing a magnitude of one of the at least one variable representing transverse dynamics of the vehicle to a threshold value; and
   performing a detection of whether the tilt tendency is present if the magnitude is greater than the threshold value.

7. The method according to claim 6, wherein the at least one variable representing transverse dynamics of the vehicle includes a particular variable describing at least one of a transverse acceleration and a yaw rate of the vehicle, the particular variable being at least one of sensed by suitable measurement means and ascertained as a function of at least the variable describing the wheel rotation speed.

8. The method according to claim 1, wherein the determining of step (e) includes the steps of:
   determining which of the at least one wheel is suitable for detecting the tilt tendency of the vehicle, the determining being a function of at least one of the at least one variable representing transverse dynamics of the vehicle; and
   performing a detection of the tilt tendency of the vehicle by at least one of briefly generating and modifying at least one of a braking torque and a drive torque at the at least one wheel.

9. The method according to claim 8, wherein the step of determining which of the at least one wheel includes the steps of:
   determining whether the vehicle is traveling through a curve, the determining whether the vehicle is traveling through the curve being a function of at least a variable ascertained from a variable describing at least one of a steering angle, a transverse acceleration of the vehicle and a yaw rate of the vehicle; and
   selecting at least one wheel of wheels on an inside of the curve for detection of the tilt tendency of the vehicle.

10. The method according to claim 8, wherein the step of determining which of the at least one wheel includes taking into account a drive concept of the vehicle.

11. The method according to claim 1, wherein the at least one of the generating and the modifying at least one of the braking torque and the drive torque at the at least one wheel includes at least one of the following steps:
   activating an actuator associated with a respective wheel so that at least one of a slight braking torque is built up and there is a slight change in a previously generated braking torque; and
   activating a means associated with a vehicle engine and the actuator associated with the respective wheel so that at least one of a slight drive torque is generated and there is a slight change in a previously generated drive torque, the means associated with the vehicle engine influencing an engine torque delivered by the vehicle engine, the actuator associated with the respective wheel generating the braking torque at the respective wheel.

12. The method according to claim 1, wherein the step of ascertaining, for the at least one wheel, the variable describing the wheel rotation speed includes the step of:
   ascertaining, for the at least one wheel, the variable describing quantitatively the wheel behavior from at least one of a variable describing a slip of a respective wheel, the variable describing the wheel rotation speed of the respective wheel, a variable describing a change over time in the wheel rotation speed of the respective wheel.

13. The method according to claim 12, wherein the step of ascertaining the variable describing quantitatively the wheel behavior includes the steps of:
   ascertaining the variable describing the slip of the respective wheel as a function of at least one of the variable describing the wheel rotation speed of the respective wheel and a variable describing a vehicle speed; and ascertaining the variable describing the vehicle speed as a function of at least one variable describing the wheel rotation speed.

14. The method according to claim 1, wherein the determining of step (e) includes the steps of:

ascertaining a resulting change in the variable describing quantitatively the wheel behavior for the at least one wheel at least one of during and after step (c), the ascertaining the resulting change in the variable describing quantitatively being used to detect the tilt tendency of the vehicle; and comparing a magnitude of the resulting change in the variable describing quantitatively the wheel behavior to a corresponding threshold value such that if the magnitude is greater than the corresponding threshold value then the tilt tendency of the vehicle is present.

15. The method according to claim 1, wherein the at least one of generating and modifying of step (c) occurs simultaneously at all wheels of the vehicle.

16. An apparatus for detecting a tilt tendency of a vehicle about a vehicle axis, the vehicle axis being oriented in a longitudinal direction of the vehicle, comprising:

first means for ascertaining, for at least one wheel, a variable describing a wheel rotation speed;

second means for ascertaining at least one variable representing transverse dynamics of the vehicle;

third means for generating signals, the signals being a function of the at least one variable representing the transverse dynamics of the vehicle, the signals activating at least one of (A) an actuator associated with a respective wheel of the at least one wheel, the actuator at least one of briefly generating and modifying a braking torque at the respective wheel and (B) means for influencing a torque delivered by an engine and actuators associated with wheels of the vehicle, the influencing means and the actuators being activated such that a drive torque is at least one of briefly generated and modified at the respective wheel;

fourth means for determining a variable describing quantitatively a wheel behavior for the at least one wheel, the variable describing quantitatively the wheel behavior being a function of at least the variable ascertained by the first means for the at least one wheel, the fourth means determining the variable describing quantitatively the wheel behavior at least one of during and after at least one of briefly generating and modifying at least one of the braking torque and the drive torque at the at least one wheel; and fifth means for determining the tilt tendency of the vehicle as a function of at least the variable determined by the fourth means for the at least one wheel.

17. The apparatus according to claim 16, wherein the apparatus is used for stabilizing the vehicle and wherein if the tilt tendency is present, then, for stabilizing the vehicle, at least at the at least one wheel, at least one of (a) the actuator associated with the at least one wheel generates a braking force, (b) the influencing means influences the engine torque and (c) chassis actuators are actuated.

18. The apparatus according to claim 17, wherein the at least one of (a), (b) and (c) includes the performance of a braking intervention at least on a front wheel on an outside of a curve, the braking intervention at least one of generating and increasing the braking torque at least at the front wheel.

19. The apparatus according to claim 16, wherein the stabilizing of the vehicle includes preventing tipover of the vehicle.

* * * * *